United States Patent [19]

Capel et al.

[11] 4,340,961
[45] Jul. 20, 1982

[54] DISTRIBUTED MULTI-PORT COMMUNICATIONS SYSTEM

[75] Inventors: Antony C. Capel; George Yan, both of Deep River; George E. Gilks, Chalk River; Rodney J. West, Pembroke, all of Canada

[73] Assignee: Atomic Energy of Canada Limited, Ottawa, Canada

[21] Appl. No.: 127,562

[22] Filed: Mar. 6, 1980

[51] Int. Cl.³ .............................................. H04J 3/16
[52] U.S. Cl. ...................................... 370/84; 370/85; 370/96
[58] Field of Search ................. 370/85, 90, 96, 67, 370/60, 88, 84; 364/200, 900

[56] References Cited

U.S. PATENT DOCUMENTS

| | | | |
|---|---|---|---|
| 3,851,104 | 11/1974 | Willard et al. | 370/85 X |
| 4,071,711 | 1/1978 | Beaupre et al. | 370/96 X |
| 4,156,106 | 5/1979 | Bumgardner | 370/88 X |
| 4,161,786 | 7/1979 | Hopkins et al. | 364/900 |
| 4,262,357 | 4/1981 | Shima | 370/85 |

Primary Examiner—Thomas W. Brown
Attorney, Agent, or Firm—Edward Rymek

[57] ABSTRACT

The terminals in a distributed multi-port communications system are connected by a common communication channel such as found on a broadcast coaxial cable. The terminals communicate with one another during sequential poll cycles to fulfill low data rate requirements or during a burst cycle to fulfill high data rate requirements. Each poll cycle includes a number of time slots with at least one time slot assigned to each terminal during which it can transmit data to any other terminal or request for a burst cycle. The burst cycles are allotted to requesting terminals in accordance with a predetermined priority. During the burst cycle, whose length varies in time with respect to the poll cycle, data are transmitted at a high data rate.

6 Claims, 6 Drawing Figures

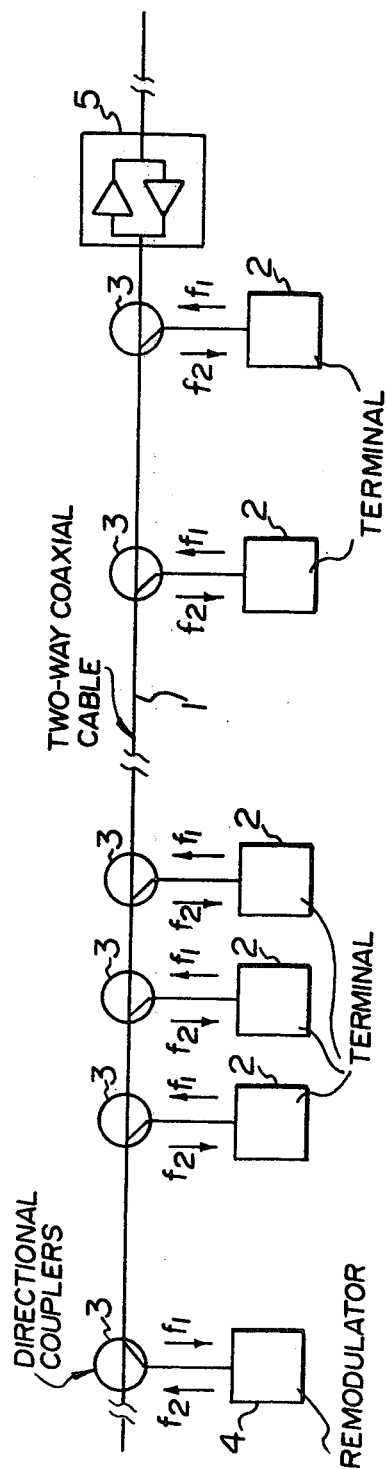
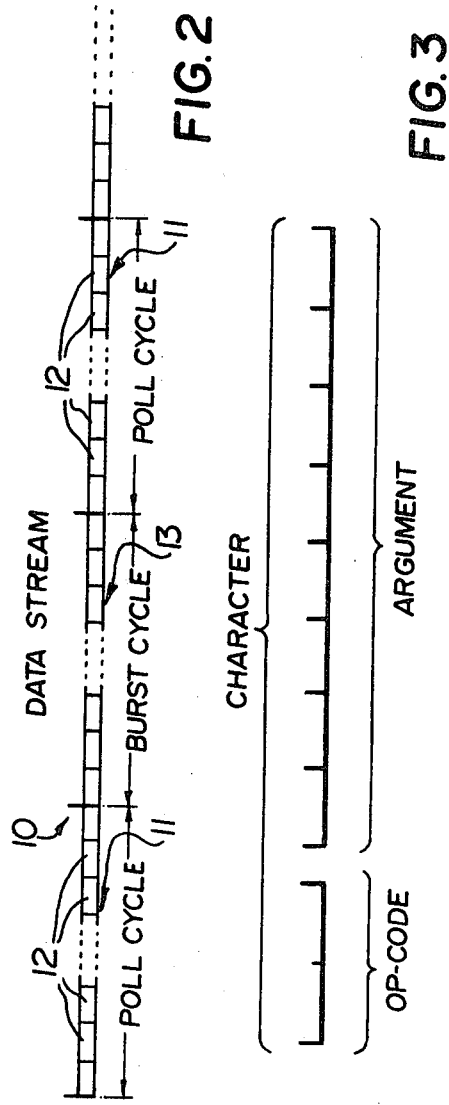

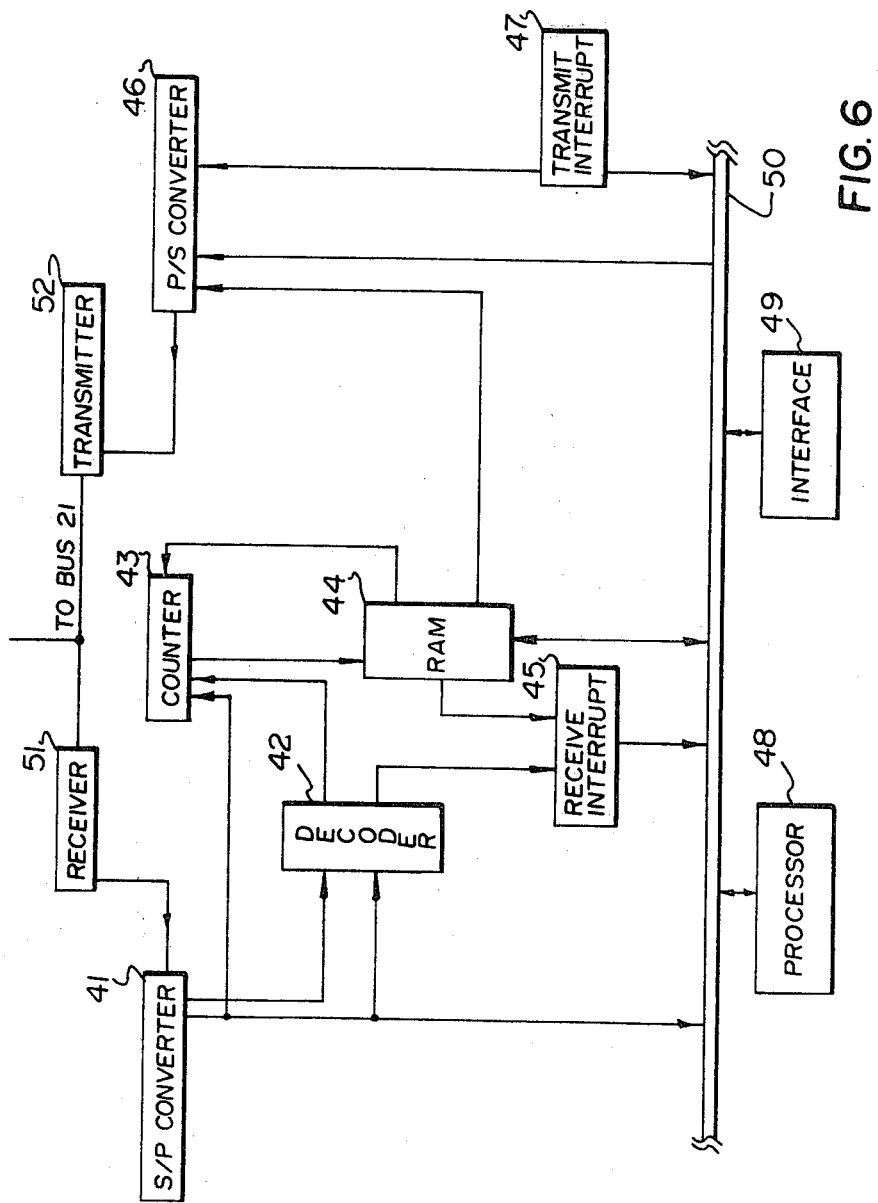

DISTRIBUTED MULTI-PORT COMMUNICATIONS SYSTEM

BACKGROUND OF THE INVENTION

This invention is directed to a system for communicating between terminals in a network and in particular to a system for communicating on a common communication channel between terminals of a distributed network.

Present communication systems generally utilize a central processor which communicates in turn with each of the other terminals in the system. Examples of such a system are U.S. Pat. No. 3,821,706 which issued on June 28, 1974 to Bennett et al and U.S. Pat. No. 3,990,046, which issued Nov. 2, 1976 to Katz et al. U.S. Pat. No. 3,821,706 describes a system wherein a plurality of remote terminals are connected to a central computer through a full duplex communication channel. U.S. Pat. No. 3,990,046 describes a similar system in which the communications link between the central station and the remote terminals consists of a low speed channel and a high speed channel.

A further method of communicating between terminals consists of packet switching in a multiaccess broadcast channel. One such method is described in the publication, "An Assigned-Slot Listen-Before-Transmission Protocol for a Multiaccess Data Channel", by Hansen et al presented at the International Conference on Communications, June 12-15, 1977, Chicago, Ill., pp. 112 to 116. In this system, each user terminal is assigned a specific sensing slot in each time frame during which the terminal will listen and determine if the channel is busy or idle. If the channel is idle, the terminal will then transmit a packet of information or data to any other terminal, but if the channel is busy, the terminal must wait and then try again. A terminal will therefore not be able to transmit data for a number of cycles until the bus is free.

SUMMARY OF THE INVENTION

It is therefore an object of this invention to provide a system for communicating between terminals having a range of data rate requirements using a multiaccess communication channel in a manner which is highly efficient and which provides a guaranteed level of service to all terminals at all times.

It is another object of this invention to provide a communications system having a high overall system reliability without a central control processor.

In accordance with one aspect of the invention, the communications system includes a common communications channel connecting all of the terminals. A modem in each of the terminals couples the user device in the terminal to the channel. The modem transmits onto the channel during one or more assigned time slots in a poll cycle or during a burst cycle; the modem receives transmissions addressed to it during time slots in the poll cycle assigned to the transmitting modem and during a burst cycle allotted to the transmitting modem. The system further includes an arbiter for initiating the poll cycle in the modems and for allotting a burst cycle to a modem upon request.

According to another aspect of the invention, the modem in each terminal includes: a receiver for receiving the addressed data from the channel, a counter controlled by received data to identify time slots and burst cycles on the bus, a circuit to identify which modem on the bus is permitted to transmit at each instant of time based on the current time slot or burst cycle, a receive circuit for recognizing data addressed to the modem, a transmit circuit for recognizing when the modem may transmit, a transmitter for transmitting data on the channel, and a processor for processing the received and transmitted data. Two or more single channel networks may be connected together by an interchannel communicator which allows any terminal in one channel to communicate with any terminal in the other channel.

A further aspect of this invention consists of a method of communicating between terminals in a network coupled to a common communication channel wherein each terminal includes a modem which has a specific address and wherein each modem transmits and receives addressed data along the common channel. The method comprises the steps of forming a poll cycle consisting of time slots wherein each terminal modem is assigned at least one time slot for low data rate transmissions; forming a burst cycle consisting of a time period of predetermined maximum length for high data rate transmissions; transmitting the data by the terminal modems in the assigned time slots of the poll cycle during low data rate requirements; requesting the use of a burst cycle by a terminal modem during a high data rate requirement; transmitting the data at a high data rate by the requesting terminal during an allotted burst cycle; and receiving the addressed data by the specifically addressed terminal modems in the time slots assigned to the transmitting terminal modems during poll cycles, and during allotted burst cycles. The ratio between poll cycle length and burst cycle length may vary but is preferably in the order of 1.

This method may further include a step of arbitrating the requests for a burst cycle by the modems in accordance with a predetermined priority for the allotment of burst cycles to requesting modems.

The above and other objects and aspects of the invention will become clear from the detailed description of the drawings.

BRIEF DESCRIPTION OF THE DRAWINGS

In the drawings:

FIG. 1 schematically illustrates a communication system having a number of terminals connected to a coaxial cable;

FIG. 2 illustrates the poll cycle-burst cycle sequence in accordance with this invention;

FIG. 3 illustrates the composition of a data character utilized in the system;

FIG. 6 illustrates a modem used in the system shown in FIG. 5.

DESCRIPTION OF THE PREFERRED EMBODIMENTS

Figure 4:
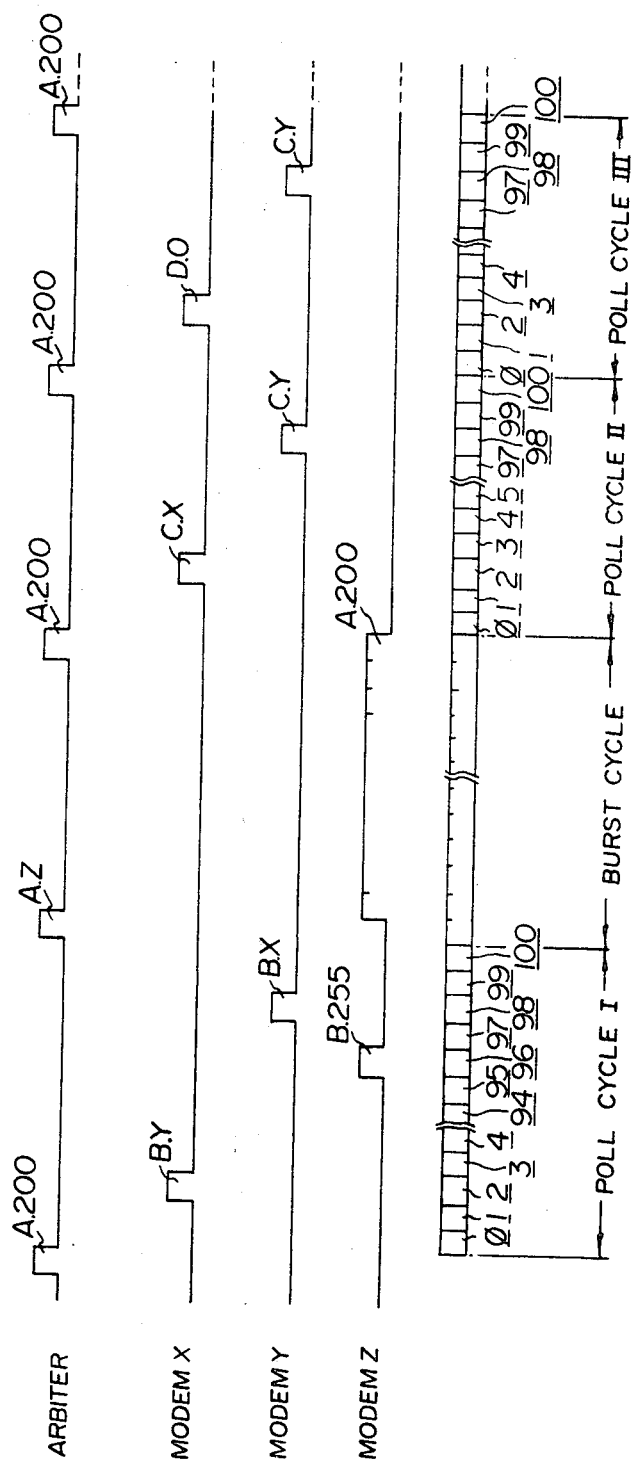
FIG. 4 illustrates examples of the system operation during sequences of cycles.

A communications system for terminals in a distributed network is typically illustrated in FIG. 1. The common channel 1 used to communicate between the terminals 2 is one of many available on various communication mediums such as a CATV two-way coaxial cable, a fiber optic bus or even open air transmission. The communication channel 1 must have sufficient capacity, and must permit any one of the terminals 2 to transmit with its transmission being received approximately instantaneously at all other terminals 2. While the present invention may be used with channels having a wide data rate range, currently available components such as for a CATV cable system make it easily applicable to channels in the ten thousand to one million bit per second range.

In a CATV two-way system, as shown in FIG. 1, the channel 1 consists of two frequency bands $f_1$ and $f_2$ which carry data between the terminals 2 that transmit in the band $f_1$ and receive in the band $f_2$. Each terminal 2 is coupled to the cable channel 1 by a directional coupler 3 which directs the transmitted data onto the cable for propagation in one direction. A conventional remodulator 4 receives the transmitted data in frequency band $f_1$, remodulates it onto the frequency band $f_2$ and retransmits it to the terminals 2 in the other direction.

In addition, though FIG. 1 shows the terminals 2 all located along one undivided channel bus 1, it may be divided so as to form a tree topology or other topology in which each terminal 2 can communicate with any other terminal 2 to maintain position independence of all terminals 2. Further, conventional bi-directional line amplifier 5 may be installed to extend the cable channel 1.

In addition, although FIG. 1 shows terminals 2 coupled to the cable by a directional coupler 3, non-directional couplers may be used to transmit frequency band $f_1$ in both directions on the cable. Modems would both transmit and receive on $f_1$. Although this technique would eliminate the requirement for the translator 4, it precludes the use of bi-directional line amplifiers 5 and in general is not suitable for large or complicated cable topologies.

The technique by which each terminal 2 is allowed to communicate with any other terminal 2 is described in conjunction with FIGS. 2 to 4. FIG. 2 illustrates the typical data stream 10 in accordance with the present invention. The stream consists of a sequence of poll cycles 11 made up of a number of discrete time slots 12 and burst cycles 13 which are interlaced between the poll cycles 11.

The time slots 12 in the poll cycle which are assigned to the terminals 2 provide the time frames in which the terminals 2 can transmit addressed data at low data rate. Each terminal 2 will have at least one time slot 12, though more than one slot 12 may be allotted to any specific terminal 2, and these slots need not be sequentially positioned in the poll cycle.

Each burst cycle 13, when allotted to a terminal 2, provides the time frame in which the terminal 2 can transmit addressed data onto channel 1 at a high data rate.

Therefore, the present invention with its low and high data rates can be applied to meet a range of communication requirements. Typical applications may range from the servicing of a group of persons typing on keyboards, to the fast movement of large amounts of data between computers. Although the data rate requirements of typists is modest, i.e. in the order of 15 characters/second, the service time must be short to prevent operator frustration. On the other hand, many of the fast data transport requirements of computers, i.e. in the order of 3500 characters/second, are less affected by proportionally longer service times.

During the time slots 12 allotted to a specific terminal 2, that terminal 2 may transmit any type of data or information it wishes including a request for a burst cycle 13. An arbiter which may be a separate terminal on bus 1, or form part of another terminal 2, has two basic functions: it starts the poll cycle 11 if no burst request exists or it allots a burst cycle 13 to a terminal 2 if so requested. The following is one example of the manner in which each terminal 2 may perform its transmitting function during its time slot 12. In this example, each poll cycle has 100 time slots. The smallest "unit of data" transmitted between modems is a "character", it consists of an op-code field and an argument field as illustrated in FIG. 3. Each time slot 12 in the poll cycle can accommodate one character. The op-code field defines the different characters used to support the operations and are four in number as shown in Table 1 and further explained in Table 2.

TABLE 1

| Generic Type | Description | Argument Used |
| --- | --- | --- |
| A | Activate Function* in all devices | Argument specifies Function* |
| B | Alert devices | Argument specifies device address |
| C | Data for alerted device(s) | Argument is 8 bit data |
| D | Activate Function* in alerted device | Argument specifies Function* |

*Function is a defined set of operations within a given device or number of devices The need to have more generic types of characters can be easily accommodated by increasing the op-code field length. Depending upon the op-codes, the content of the argument field is interpreted as device address, data or function. The argument field length is 8 bits. The need for a larger data width or increased number of devices or functions can be accommodated by increasing the argument length. Table 2 illustrates some character codes and their meaning in a practical system.

TABLE 2

| | Typical Character Codes |
| --- | --- |
| A.0 | Initiate burst cycle to device #0 |
| . | |
| . | |
| . | |
| A.199 | Initiate burst cycle to device #199 |
| A.200 | Initiate poll cycle |
| A.212 | Prepare to reset system |
| A.213 | Reset system if immediately preceeded by A.212 |
| B.0 | Alert device #0 |
| . | |
| . | |
| . | |
| B.199 | Alert device #199 |
| B.255 | Burst request |
| C.0 | Data character |
| . | |
| . | |
| . | |
| C.255 | Data character |
| D.40 | De-alert device (opposite to B codes) |
| D.41 | Abort current message, and de-alert |

With the above in mind, and since all receivers monitor the common channel 1 for alert characters, it is seen that the transmitting function from one terminal to another operates in the following manner:

(a) A modem in one terminal having data to transmit alerts the modem in the intended receiver terminal by sending a type B character (Table 2) along with the desired receiver's 8-bit address during its time slot. The appropriate receiver is alerted as to the time slot or slots in which it will receive data.

(b) The sender transmits the data or requests to activate a function in the form of type C or D characters during the appropriate slots. All modems ignore this sender except for the one which was previously alerted.

(c) After all the data have been sent, the sender "de-alerts" the receiver by sending a D.40 character.

If a terminal modem is only allotted one time slot per cycle or if only one time slot of the number allotted is to be used, then the transmission of data to the desired terminal may take a number of successive poll cycles.

As mentioned above, an arbiter is required on the bus to perform two functions as exemplified in FIG. 4. The first is to initiate the poll cycle by transmitting the character A.200 which will cause all of the terminals to reset for the poll cycle count. This A.200 character is transmitted in the last time slot of each poll cycle when a burst cycle has not been requested, i.e. before poll cycles I and III in FIG. 4. The second function is to receive burst cycles requests at any time and to initiate the burst cycle by transmitting the character A.m where m is the requesting device number in the last time slot of a poll cycle, e.g. poll cycle I in FIG. 4.

FIG. 4 exemplifies a number of situations which may occur in a system. During poll cycle I, modem X in its time slot 2 and using code B.Y alerts modem Y for transmissions; in poll cycle II, modem X transmits data to modem Y using the C code; and in poll cycle III, modem X de-alerts modem Y using code D.40. During the same poll cycles, modem Y can transmit to modem X. In poll cycle I, during its time slot 98, modem Y alerts modem X, and in poll cycles II and III and subsequent poll cycles, until modem X is de-alerted, modem Y in its time slot 98, transmits data using C codes to modem X.

Simultaneously, modem Z in its time slot 96, has been transmitting to modem U. Modem Z, requiring a high data rate, requests a burst cycle using code B.255 during poll cycle I. The arbiter grants a burst cycle to modem Z using the A.Z code at the end of poll cycle I. Modem Z is then able to continue to transmit during the consecutive time slots of the burst cycle, returning to sending in the poll cycle slots when the burst cycle is terminated.

A maximum time limit is associated with the burst cycle and has in this example been set to equal the length of time required by a poll cycle (i.e. burst to poll ratio 1:1). At the end of this time or whenever data are no longer available, the burst cycle may be terminated with an A.200 poll initiate character issued by modem Z. In this way, a poll cycle would follow a burst cycle. However, the arbiter is arranged to initiate the poll cycle, as shown in FIG. 4, if the burst cycle modem fails to do so as shown in broken lines in FIG. 4 prior to poll cycle II.

The present communications system may be configured to meet a guaranteed minimum service time at low data rates while at the same time offering a high average data transport capability with a more variable and proportionally longer service time.

In assessing system performance, the terms used are: Guaranteed Service Rate and Average Service Rate. Guaranteed service rates are provided to each terminal 2 under all operating loads, and reflects the ability of the system to move information between terminals 2 using poll cycles 11. Average service rates depend upon system loading and are the sum of the guaranteed rate supplied by poll cycles 11, and the higher rate available using burst cycles 13 whenever they are granted. By adjusting the length of poll 11 and burst 13 cycles, and by constraining the order of poll 11 and burst 13 cycles, various systems with different guaranteed and average service rate requirements may be implemented.

Each time slot 12 in the poll cycle 11 is allocated to one terminal 2, although each terminal 2 may have more than one slot 12. The longer the poll cycle 11, the more slots 12 are available for distribution between the attached terminals 2. The maximum length of a poll cycle 11 is limited by operational and technical design factors. Operationally, the longer the poll cycle 11 the slower the rate at which they occur (assuming constant burst cycles 13), so that the period between specific slot times 12 increases, thus reducing the guaranteed service rate. Technically, the poll cycle 11 cannot be too long or the time slot 12 identifying hardware in each modem 2 will drift sufficiently with respect to one another that ambiguous slot identifications will occur. With currently available low-cost components having a 0.01% time accuracy, a 200 slot poll cycle 11 is easily supported with only about a 4% increase in slot width to accommodate this effect.

The length of each burst cycle 13 is controlled by the transmitting terminal 2. In a particular system, it is desirable to limit the maximum length of individual burst cycles 13, this limit being adhered to by all correctly operating terminals 2. Some systems with terminals 2 having differing requirements may have individually set different maxima, although in the preferred embodiment a single limit is imposed to all terminals 2, and violations are detected and terminated in malfunctioning units by auxiliary protection components. Increasing the maximum length of the burst cycle 13 will increase the period between poll cycles 11 thus reducing the guaranteed service rate. However, such an increase will tend to increase the average system rate for non-fully loaded systems since fewer unused poll cycle 11 time slots 12 will occur. In addition a further increase in the average service rate will result since the time required to transmit a character in a burst cycle 13 is shorter than that required in a poll cycle 11 since timing errors, propogation time allowances, transmitter turn-on and off allowances and receiver signal acquisition and release allowances are not required. In the embodiment using CATV components the time required to transmit a character in a burst cycle 13 is approximately 35% shorter than during a poll cycle 11.

In addition to poll 11 and burst cycle 13 length adjustments, the order of poll 11 and burst cycles 13 may be adjusted. The efficiency of a relatively long burst cycle 13 granted to a single terminal 2 may be maintained without a degradation in the guaranteed rate (rate of poll cycles) by limiting the burst cycle 13 to occur only after two sequential poll cycles 11. The average service rate may be increased at the expense of the guaranteed rate by allowing more than one burst cycle 13 to occur after a poll cycle 11. The latter may be accomplished by allowing the bursting transmitter to allocate the following cycle to another modem 2 or by allowing the bursting modem to transfer control to an arbitrating function which in turn grants the following burst cycle 13 to another terminal 2. Such transfers of burst 13 or poll cycle 11 control may be accomplished by the use of A type characters.

Figure 5:
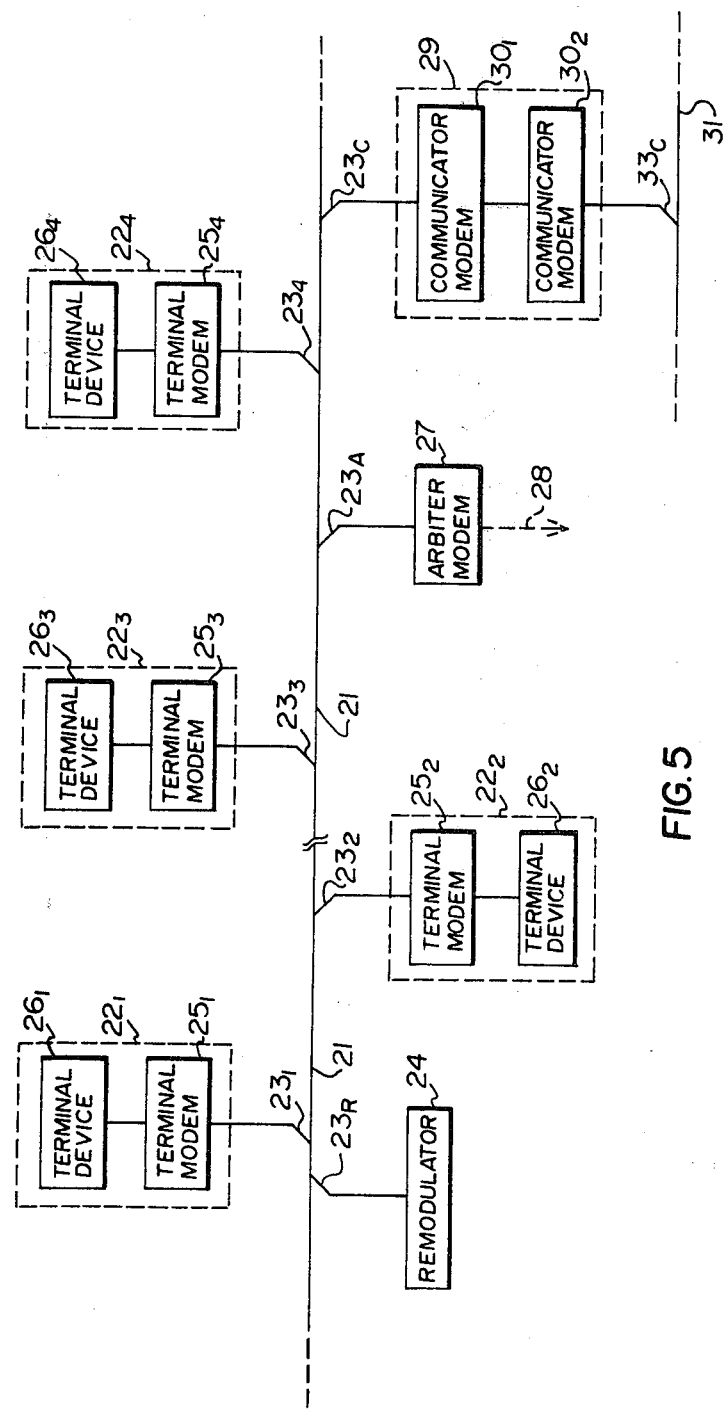
FIG. 5 schematically illustrates a communication system in accordance with the present invention.

FIG. 5 schematically illustrates a communications system for linking a distributed terminal network. Terminals $22_1$, $22_2$, $22_3$, $22_4$, ... are coupled to the coaxial cable 21 through directional couplers $23_1$, $23_2$, $23_3$, $23_4$, ... Each terminal includes a terminal modem $25_1$, $25_2$, $25_3$, $25_4$, ... which interfaces between the bus 21 and the various network devices $26_1$, $26_2$, $26_3$, $26_4$, ... such as processors, memories, data bases, monitors, control units, input/output devices, etc. Any type of device may be connected into the system through a modem $25_n$. With the CATV cable system having a transmit band $f_1$ and receive band $f_2$, a remodulator 24 is coupled to the bus 21 through a directional coupler $23_R$. To complete the system, an arbiter modem 27 is coupled to the bus 21 through a directional coupler $23_A$.

In some applications of the present invention, insufficient capacity or performance may be obtained by a single channel system, or an insufficient level of reliability may be attained by a single channel system. In these cases, two, 21 and 31 or more single channels may be interconnected by an interchannel communicator 29 made up of two communicator modems $30_1$ and $30_2$ which are similar to the terminal modems $25_1$, $25_2$, ... . Each of the single channel systems may have the same or different poll and burst cycle length, and order constraints. Terminals 22 attached to one system may communicate with terminals in the other via an inter-channel communicator 29. The communicator 29 receives and transmits on one channel 21 in an identical manner to other terminals $22_1$, $22_2$, ..., on that channel 21, and transmits and receives on the other channel 31 in an identical manner to terminals on this other channel 31. In addition to these transmitting and receiving functions, the communicator 29 operates to buffer the data transmissions and to facilitate the addressing of terminals between channels 21 and 31.

The schematic diagram of each modem $25_n$ connected to the channel bus 21 is shown in FIG. 6. A receiver 51 is connected to bus 21 to receive the serial data and feed it to a serial-to-parallel converter 41 which converts the incoming serial data stream to parallel characters. In the embodiment discussed with reference to FIG. 3, the parallel character consists of an 8-bit argument and a 2-bit op-code. The serial-to-parallel converter 41 is connected to an op-code and argument decoder 42 for decoding the special function codes including all A and B type codes. The decoder 42 is coupled to the slot counter 43 which consists of a counter operating from a locally generated time source. It is reset by the A.200 code decoded by 42 or preset to the slot number of a terminal allotted a burst cycle, by a burst grant code also decoded by 42.

A random access read/write memory 44 controls the operation of the receiver and transmitter according to the current slot number in counter 43. RAM 44 outputs determine slots in which the transmitter may transmit and slots in which the receiver has received an alert command and thus expects data and commands of the C and D type. RAM 44 also provides a "stop" signal to the slot counter 43 when the highest poll slot for the system has been reached. RAM 44 can also be accessed by a processor 48 through the processor bus 50.

A receive interrupt control 45 is coupled to the decoder 42 and the RAM 44 for generating interrupt requests to the processor bus 50 at all times when certain commands are decoded by 42, and at other times depending upon command type decoded by 42 and the current alert status as designated by RAM 44. RAM 44 also controls a parallel-to-serial converter 46 which converts parallel op-code and argument data to serial format for transmission onto bus 21 by a transmitter 52. Processor 48 provides the argument and op-code. A transmit interrupt control 47 is coupled between converter 46 and processor bus 50 to generate an interrupt request to processor 48 when converter 46 is empty. For failure recovery purposes, the processor 48 may load op-code and argument data to converter 46 and force a transmission regardless of RAM 44.

Processor 48 coupled to processor bus 50 provides computation data storage and control functions. The programs stored in processor 48 will vary depending upon whether the modem is a terminal modem $25_n$, an arbiter modem 27 or a communicator modem 30. The interface 49 when used with the terminal modem $25_n$ provides the physical connection to the local equipment in the terminal device $26_n$. In the interchannel communicator 29, the interface 49 in one communicator modem $30_1$ connects with the interface 49 in the other communicator modem $30_2$. In the arbiter modem 27, interface 49 is not required, though it may be used to connect to a local display to monitor and/or modify system performance.

An example of a data transmission between two modems using the character codes of Table 2 is given. The data to be transferred originates in terminal 26 and is read and stored by processor 48 via interface 49. Processor 48 determines the destination modem's address from previous data given or via information contained in data to be transferred. Processor 48 loads the converter 46 with an alert command with the destination modem's address as the argument, for example B.16. This character is serialized by converter 46 and broadcast on the bus 21 by transmitter 52 when the next poll or burst cycle allocated to the modem is detected by counter 43 and RAM 44. When converter 46 becomes empty, interrupt control 47 interrupts the processor 48, and in this manner repeated sequential C op-code data characters are transmitted. After all data have been sent, processor 48 completes the transmit operation by loading the de-alert code D.40 to converter 46.

The destination modem's receiver 51 and converter 41 receive all characters from the bus. Some of these characters control the operation of the counter 43, some are valid characters for this modem, and some are of no interest to this modem. Decoder 42 in conjunction with RAM 44 segregate these characters. The A.200 character is decoded by decoder 42 which resets counter 43 to zero and starts it counting in synchronism with the poll cycle which is currently occurring on the bus 21. For A codes less than 200, decoder 42 causes the argument to be loaded into the counter 43 and the counter 43 stopped, thus permitting all modems to respond to the burst cycle initiate codes of Table 2. Other A and B op-code characters may be ignored or decoded by decoder 42 to provide interrupts to the processor 48 via the receive interrupt circuits 45.

When decoder 42 detects the alert op-code with its own address as an argument, B.16 in this example, processor 48 is interrupted. Processor 48 determines that it is an alert op-code and reads the counter 43 to determine the transmitting modem's address. From this address the processor 48 determines the slot or slots in which the transmitting modem will transmit. Locations in RAM 44 are set appropriately to the family of slots used by the transmitting modem. Whenever decoder 42 decodes C or D op-codes, the locations in RAM 44 as addressed by counter 43 are used by the receiver interrupt circuit 45 to indicate to processor 48 that the received character is of interest. Processor 48 reads the counter 43 along with each character to determine its source. When the D.40 character is received at the end of a transmission, the appropriate locations in RAM 44 are cleared by processor 48.

Although in the described example, the receiving modem is alerted and de-alerted in a manner which brackets the data transmission, for applications requiring more rapid transfers a receiving modem may remain alerted to the transmitter. In addition, although only one receive modem was alerted in the example, multiple receivers may be alerted by prefixing the message with more than one alert character.

The use of decoder 42 and RAM 44 in this manner represents a design which minimizes processor 48 overhead. Evidently, other implementations are possible, for example the use of a second processor to individually examine and operate on each receive character, and to monitor the counter 43 to initiate transmit operations.

Modifications in the above described embodiments of the invention can be carried out without departing from the scope thereof and therefore the scope of the present invention is intended to be limited only by the appended claims.

We claim:

1. A communication system for terminals in a network comprising:
   a common communication channel to which the terminals are coupled;
   modem means in each of the terminals for coupling a user device in the terminal to the common channel, the modem means including means for transmitting onto the common channel during one or more assigned time slots in a poll cycle or during a burst cycle, the modem means further including means for receiving transmissions addressed to the modem means through the common channel during time slots in the poll cycle assigned to the transmitting modem means and during a burst cycle allotted to the transmitting modem means; and
   arbiter means for initiating the poll cycle in each modem means and for allotting a burst cycle to a modem means upon request.

2. A communication system as claimed in claim 1 which further includes communicator means coupled to the common channel to connect the common channel to a further common channel in a similar network.

3. A method of communicating between terminals in a network coupled to a common communication channel wherein each terminal includes a modem having a specific address and wherein each modem transmits and receives addressed data on the common channel, comprising:
   (a) forming a poll cycle consisting of time slots wherein each terminal modem is assigned at least one time slot in the poll cycle for low data rate transmissions;
   (b) forming a burst cycle consisting of a time period of predetermined maximum length for high data rate transmissions;
   (c) transmitting the data by the terminal modems in the assigned time slots of the poll cycles during low data rate requirements;
   (d) requesting the use of a burst cycle by a terminal modem during a high data rate requirement;
   (e) transmitting the data at the high data rate by the requesting terminal modem during an allotted burst cycle;
   (f) receiving the addressed data by the specifically addressed terminal modem in the time slots assigned to the transmitting terminal modems during poll cycles and during allotted burst cycles; and
   (g) arbitrating the request for a burst cycle by the modems according to a predetermined priority for the allotment of burst cycles to requesting modems.

4. A method as claimed in claim 3 wherein the poll cycle and the burst cycle are substantially of equal length in time.

5. A communication system for terminals in a network comprising:
   a common communication channel to which the terminals are coupled;
   modem means in each of the terminals for coupling a used device in the terminal to the common channel, wherein each modem means includes: means for recognizing the modem means time slots or burst cycle; means for transmitting addressed data during the modem means time slots or burst cycle; means for receiving addressed data from other modem means; counter means controlled by received data for identifying time slots or burst cycles in the received data; means for identifying the modem means permitted to transmit during time slots or burst cycle; means for recognizing received data addressed to the modem means; and processor means for processing the received and transmitted data; and
   arbiter means for initiating the poll cycle in each modem means and for allotting a burst cycle to a modem means upon request.

6. A communication system as claimed in claim 5 which further includes communicator means coupled to the common channel to connect the common channel to a further common channel in a similar network.

* * * * *